United States Patent [19]
Lutz et al.

[11] Patent Number: 5,143,508
[45] Date of Patent: Sep. 1, 1992

[54] CARGO CARRYING VEHICLE HAVING A MOVABLE BULKHEAD LOCATED THEREIN

[76] Inventors: David E. Lutz, P.O. Box 810; David W. Lutz, P.O. Box 4444, both of Carlisle, Pa. 17013

[21] Appl. No.: 651,025

[22] Filed: Feb. 5, 1991

[51] Int. Cl.$^5$ .............................................. B60P 1/00
[52] U.S. Cl. .................................. 414/510; 198/747; 414/514; 414/516; 414/521
[58] Field of Search ............... 414/507, 509, 510, 511, 414/512, 513, 514, 515, 516, 517, 521, 527, 679; 198/747; 410/128, 151

[56] References Cited

U.S. PATENT DOCUMENTS

| | | | |
|---|---|---|---|
| 2,318,886 | 5/1943 | Paiement | 414/516 |
| 2,523,916 | 9/1950 | Paiement | 414/516 |
| 2,726,776 | 12/1955 | Myers | 414/515 X |
| 2,753,057 | 7/1956 | Miller | 414/516 |
| 2,909,295 | 10/1959 | Weir | 414/515 |
| 3,164,410 | 1/1965 | Roginson et al. | 414/515 X |
| 3,722,717 | 3/1973 | Stryczek | 414/521 |
| 4,078,682 | 3/1978 | Johnson Jr. | 414/515 X |
| 4,082,196 | 4/1978 | Lutz et al. | 414/521 |
| 4,578,015 | 3/1986 | Balderelli et al. | 414/513 |

FOREIGN PATENT DOCUMENTS

| | | | |
|---|---|---|---|
| 190397 | 6/1953 | Fed. Rep. of Germany | 414/516 |
| 2536391 | 2/1977 | Fed. Rep. of Germany | 414/515 |

*Primary Examiner*—Robert J. Spar
*Assistant Examiner*—Robert S. Katz
*Attorney, Agent, or Firm*—Oblon, Spivak, McClalland, Maier & Neustadt

[57] ABSTRACT

A cargo carrying vehicle 10 including a body 12, a movable bulkhead 34 mounted in the interior 14 of the body 12 for movement relative to the body 12, and a plurality of inexpensive cables for stabilizing the movable bulkhead 34 against pivotal movement relative to the internal sidewalls 18, 24 of the body 12. A clamp that is movable relative to the movable bulkhead 34 grips and releases one or more of the inextensible cables, driving the movable bulkhead 34 along the inextensible cables in either direction. The clamp also restrains the movable bulkhead 34 against unwanted forward movement due to quick stops and prevents the load from retreating when the movable bulkhead 34 is used in connection with a reciprocating full or partial floor.

38 Claims, 11 Drawing Sheets

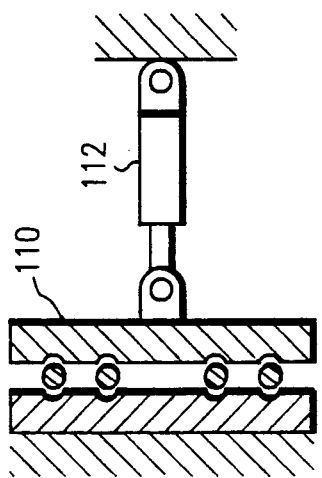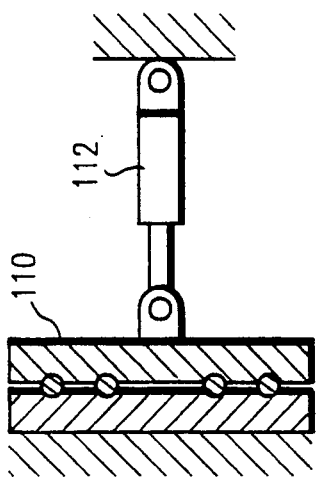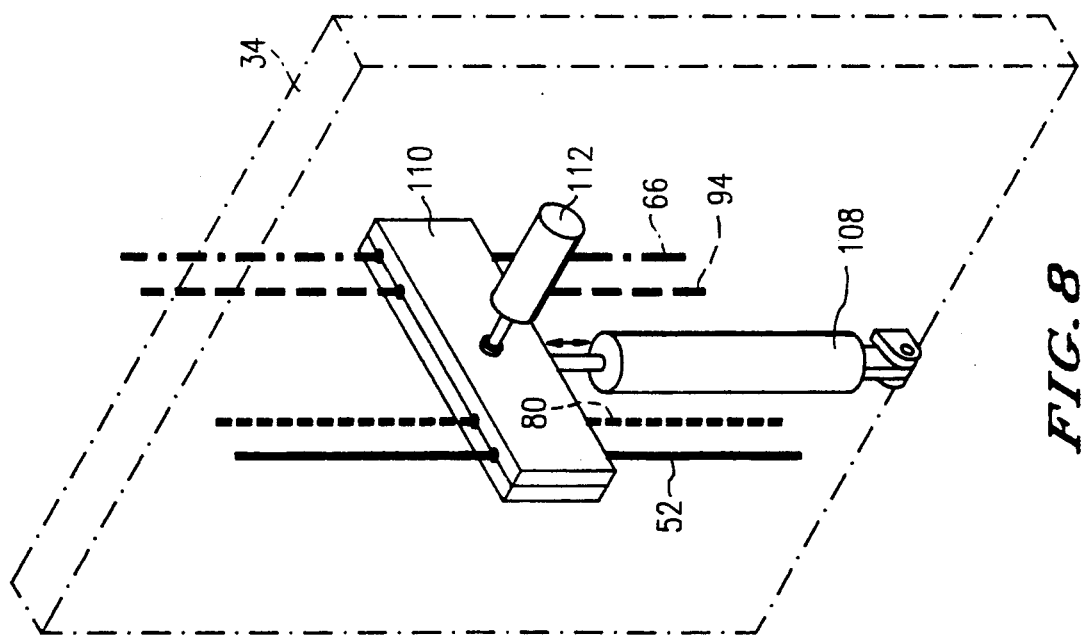

CARGO CARRYING VEHICLE HAVING A MOVABLE BULKHEAD LOCATED THEREIN

CROSS REFERENCE TO RELATED APPLICATION

This application is related to U.S. Pat. application Ser. No. 07/415,719, filed Oct. 02, 1989, now U.S. Pat. No. 5,009,564 by the same inventors.

FIELD OF THE INVENTION

The invention pertains to a cargo carrying vehicle having unloading means located in the interior thereof.

OBJECTS OF THE INVENTION

It is the principal object of this invention to provide an improved mechanism for moving a movable bulkhead located in the interior of a cargo carrying vehicle.

It is another object of this invention to provide improved stabilization for a movable bulkhead located in the interior of a cargo carrying vehicle.

The invention is well suited for use with the invention disclosed and claimed in the previously mentioned application filed by the same two inventors (the disclosure of which is hereby incorporated by reference herein), but it is not limited to use with the invention disclosed and claimed in that application.

SUMMARY OF THE INVENTION

The invention comprises a cargo carrying vehicle comprising a body, a movable bulkhead mounted in the interior of the body for movement relative to the body, means for stabilizing the movable bulkhead against pivotal movement relative to the internal side walls of the body, and means for moving the movable bulkhead relative to the internal side walls of the body. The movable bulkhead may be used alone to simply push cargo into or out of the body or it may be used in conjugation with a reciprocating floor. The reciprocating floor may cover all or part of the vehicle's fixed (or integral) floor.

BRIEF DESCRIPTION OF THE DRAWINGS

FIG. 8 is a schematic perspective view illustrating the first embodiment of means for moving the movable bulkhead and a first embodiment of means for immobilizing the movable bulkhead relative to the inextensible cables.

FIG. 9 is a cross-sectional view showing the first embodiment of means for immobilizing the movable bulkhead relative to the inextensible cables in the first embodiment of the invention in its closed position.

FIG. 10 is a cross-sectional view showing the first embodiment of means for immobilizing the movable bulkhead relative to the inextensible cables in the first embodiment of the invention in its open position.

DETAILED DESCRIPTION OF THE PRESENTLY PREFERRED EMBODIMENTS

Figure 1:
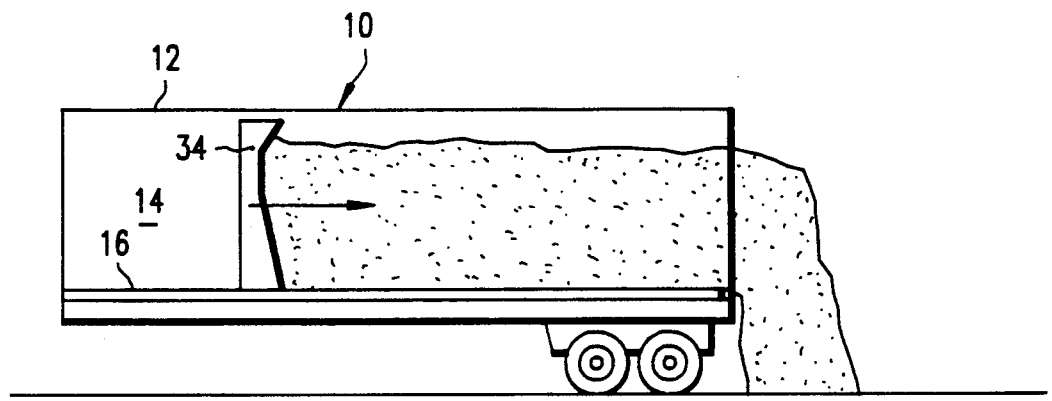
FIG. 1 is a schematic side view illustrating the operation of the invention in unloading a bulk cargo.
Figure 2:
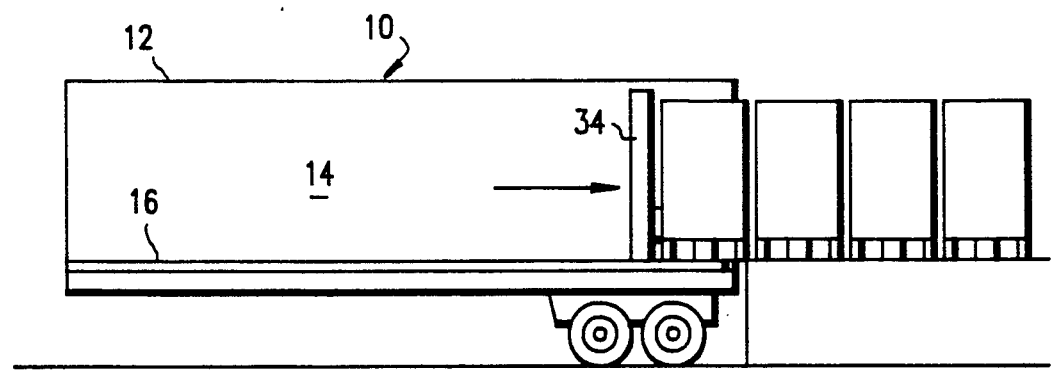
FIG. 2 is a schematic side view illustrating the operation of the invention in unloading palletized cargo containers.
Figure 3:
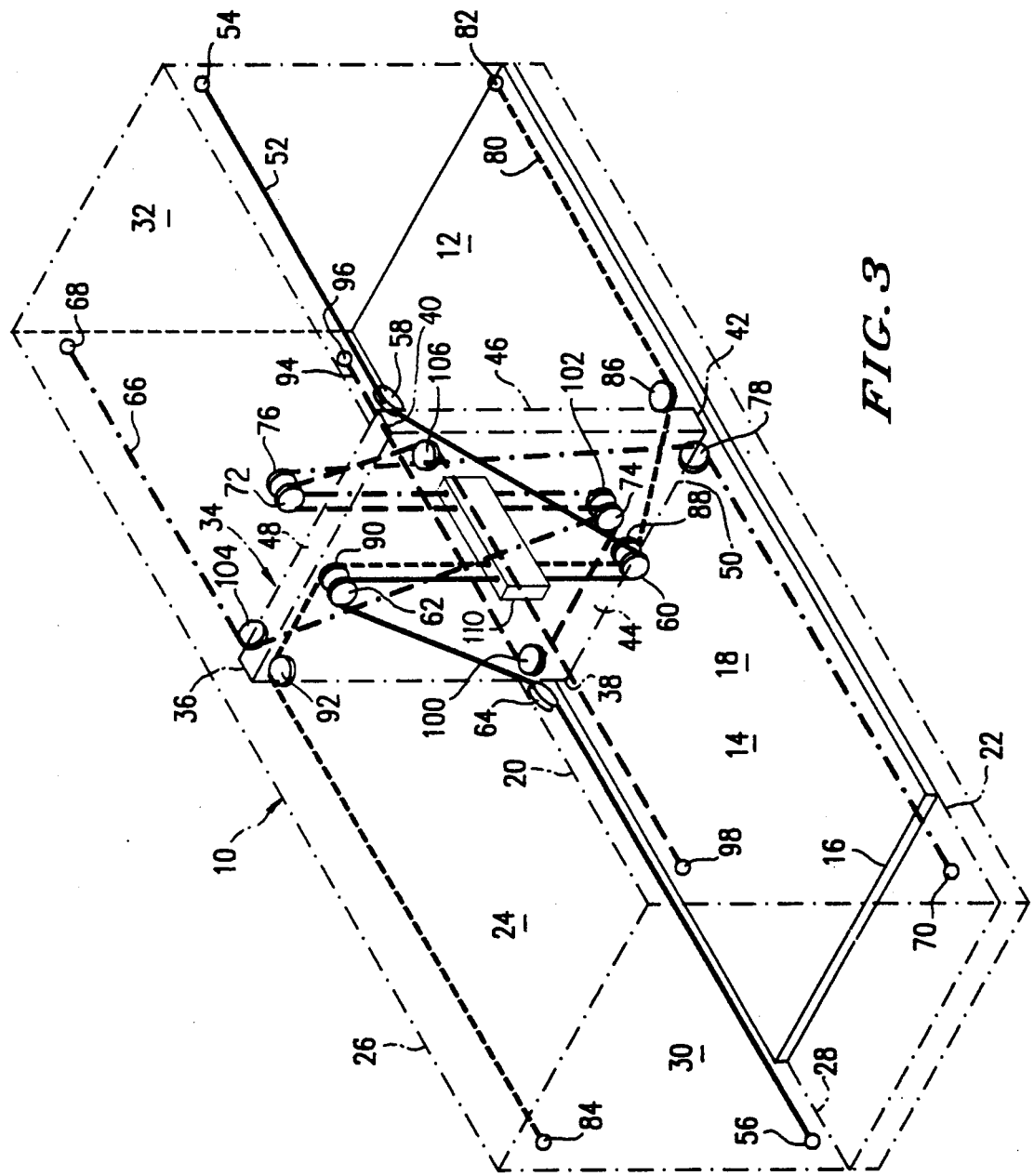
FIG. 3 is a schematic perspective view illustrating a first embodiment of means for stabilizing the moving bulkhead and a first embodiment of means for moving the moving bulkhead.
Figure 5:
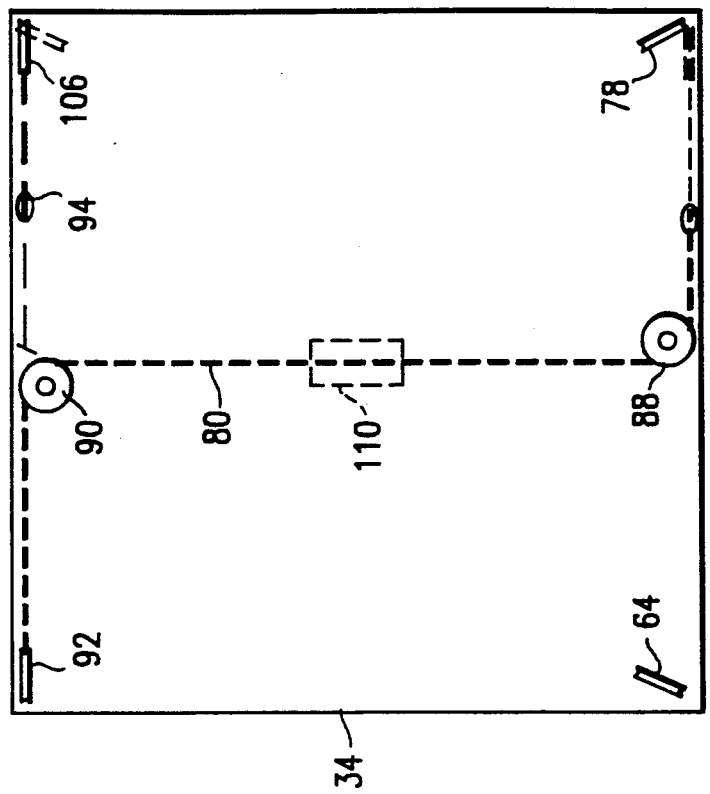
FIG. 5 is a front view of the movable bulkhead illustrating the third inextensible cable in the first embodiment of the invention.
Figure 4:
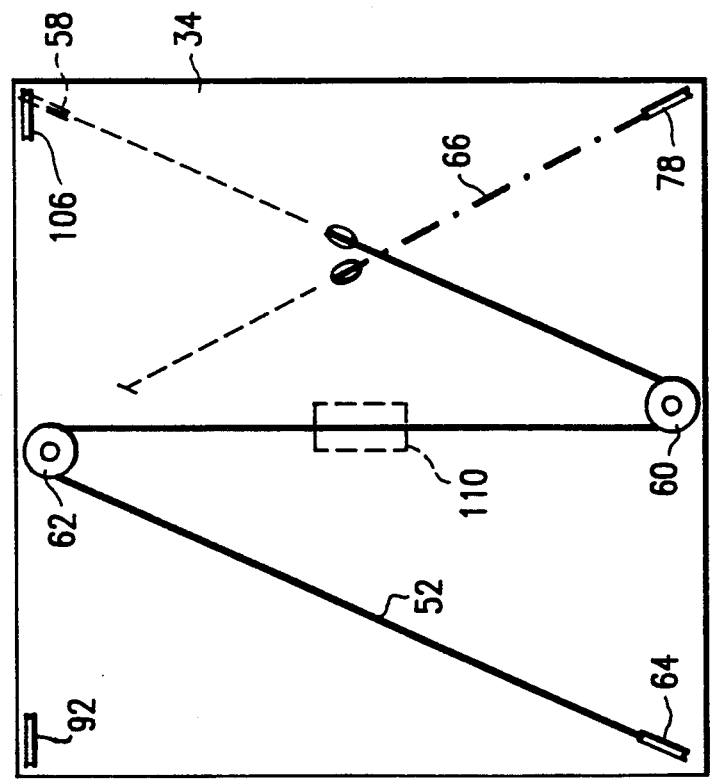
FIG. 4 is a front view of the movable bulkhead illustrating the first inextensible cable in the first embodiment of the invention.
Figure 7:
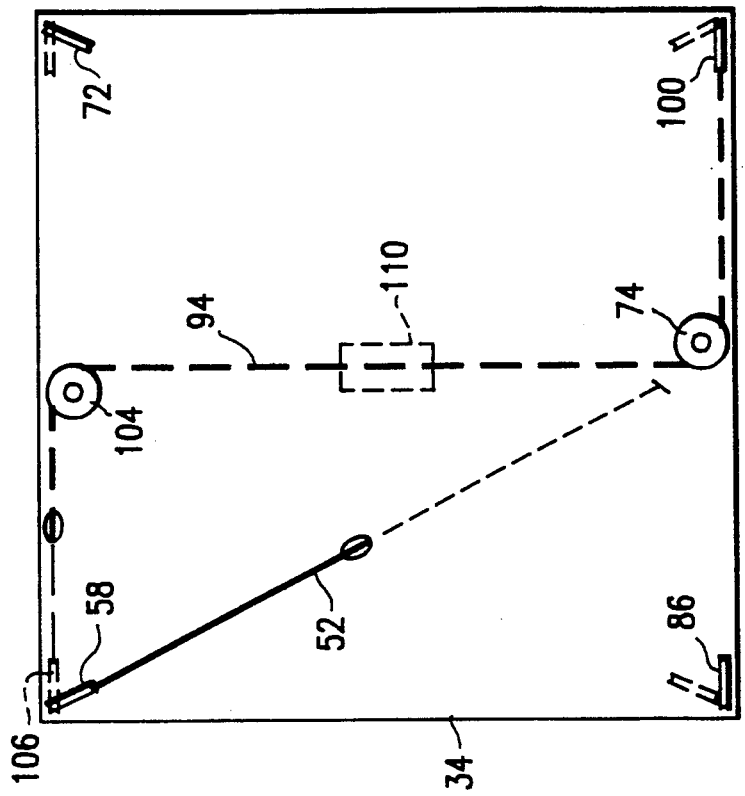
FIG. 7 is a rear view of the movable bulkhead illustrating the fourth inextensible cable in the first embodiment of the invention.
Figure 6:
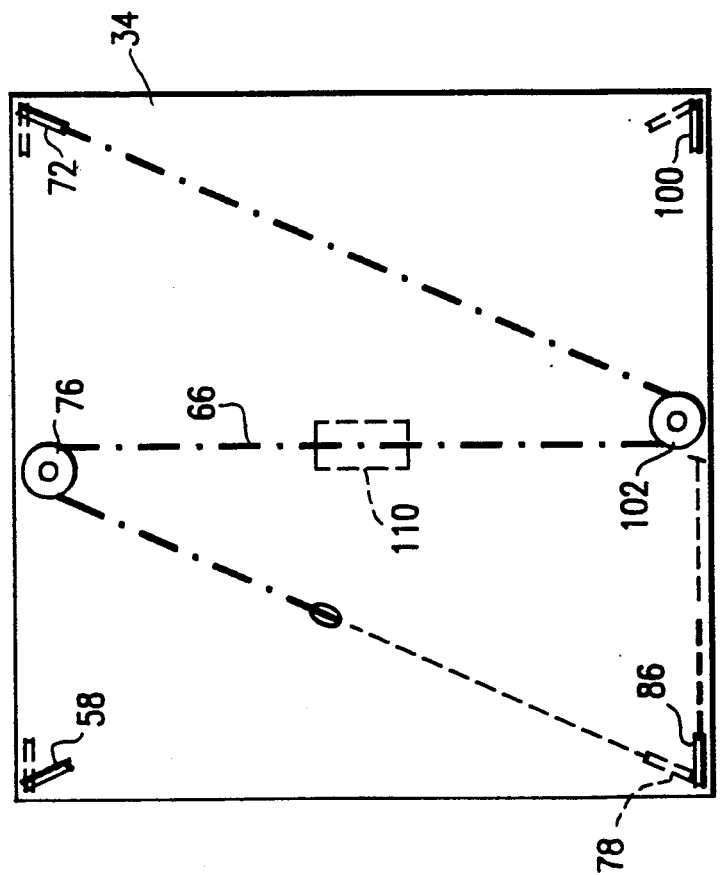
FIG. 6 is a rear view of the movable bulkhead illustrating the second inextensible cable in the first embodiment of the invention.

FIGS. 1-3 show a cargo carrying vehicle 10 (which, in the illustrated embodiment, is a trailer, but which might be a truck or other type of cargo carrying vehicle) comprising a generally rectangular parallelepipedal body 12. The body 12 has an interior 14, an internal floor 16, a left internal sidewall 18 having an upper edge 20 and a lower edge 22, a right internal sidewall 24 having an upper edge 26 and a lower edge 28, a longitudinal axis (not specifically illustrated), a front end 30, and a rear end 32.

Figure 18:
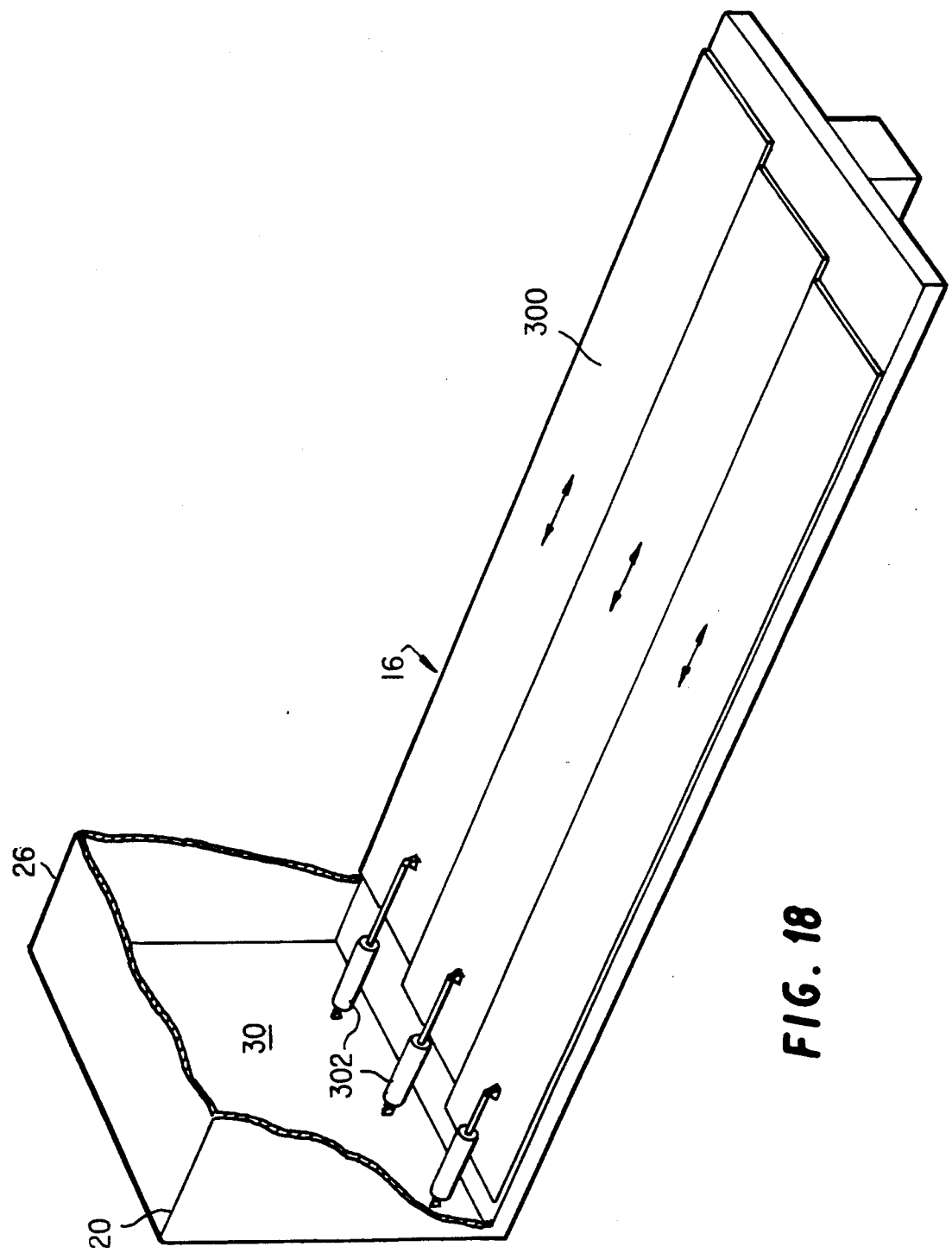
FIG. 18 is a schematic perspective view illustrating a segmented reciprocating floor.

The internal floor 16 may be fixed or reciprocating relative to a lower fixed (or integral) floor of the cargo carrying vehicle 10. If the internal floor 16 is reciprocating, it can cover all or part of the fixed (or integral) floor of the cargo carrying vehicle 10. In addition, the internal floor 16 may be segmented, as described in the previously mentioned application filed by the same two inventors and as illustrated in FIG. 18. If it is segmented, the segments of the internal floor 16 can be either immediately adjacent to one another (so as to constitute a continuous surface) or spaced laterally from each other.

A movable bulkhead 34 is mounted in the interior 14 for movement relative to the internal floor 16. The movable bulkhead 34 has an upper right corner 36, a lower right corner 38, an upper left corner 40, a lower left corner 42, a central vertical transverse plane (not specifically illustrated), a central vertical longitudinal plane (not specifically illustrated), a front face 44, a rear face 46, an upper edge 48, and a lower edge 50. (The descriptions "left" and "right" are, of course, somewhat arbitrary. They are used with respect to someone looking into the back of the body 12, which is where the cargo loading and unloading opening normally is.)

The description so far would apply equally to the inventors' previously mentioned prior application. However, the inventors' new means for moving and stabilizing the movable bulkhead 34 will now be described. Preliminarily, however, it will be pointed out that much of the apparatus described hereinafter (particularly the pulleys) would normally be enclosed within front and rear surfaces of the movable bulkhead 34 in order to avoid injury or contamination from the cargo and, in turn, in order to avoid injuring or contaminating the cargo. However, for ease of understanding the front and rear surfaces of the movable bulkhead 34 are not illustrated except in FIGS. 1 and 2, and the references to the "front" and "rear" faces of the movable bulkhead 34 should be interpreted as referring to the front and rear sides of the central (i.e., left-right) vertical longitudinal plane of the movable bulkhead 34 rather than as necessarily referring to the outermost surfaces of the movable bulkhead 34.

The First Embodiment of the Bulkhead Stabilizing Means

A first inextensible cable 52 has a first end 54 mounted on the body 12 adjacent the rear end 32 of the body 12 and adjacent the upper edge 20 of the left internal sidewall 18 and a second end 56 mounted on the body 12 adjacent the front end 30 of the body 12, on or adjacent the internal floor 16, and adjacent the right internal sidewall 24. The first inextensible cable 52 is trained over a first pulley 58 that is mounted on the rear face 46 of the movable bulkhead 34 adjacent its upper left corner 40, a second pulley 60 that is mounted on the front face 44 of the movable bulkhead 34 in its central vertical transverse plane adjacent its lower edge 50, a third pulley 62 that is mounted on the front face 44 of the movable bulkhead 34 in its central vertical transverse plane adjacent its upper edge 48, and a fourth pulley 64 that is mounted on the front face 44 of the movable bulkhead 34 adjacent its lower right corner 38.

A second inextensible cable 66 has a first end 68 mounted on the body 12 adjacent the rear end 32 of the body 12 and adjacent the upper edge 26 of the right internal sidewall 24 and a second end 70 mounted on the body 12 adjacent the first end 30 of the body 12, on or adjacent the internal floor 16, and adjacent the left internal sidewall 18. The second inextensible cable 66 is trained over a fifth pulley 72 that is mounted on the rear face 46 of the movable bulkhead 34 adjacent its upper right corner 36, a sixth pulley 74 that is mounted on the rear face 46 of the movable bulkhead 34 in its central vertical transverse plane adjacent its lower edge 50, a seventh pulley 76 that is mounted on the rear face 46 of the movable bulkhead 34 in its central vertical transverse plane adjacent its upper edge 48, and an eighth pulley 78 that is mounted on the front face 44 of the movable bulkhead 34 adjacent its lower left corner 42.

A third inextensible cable 80 has a first end 82 mounted on the body 12 adjacent the rear end 32 of the body 12, on or adjacent the internal floor 16, and adjacent the left internal sidewall 18 and a second end 84 mounted on the body 12 adjacent the first end 30 of the body 12 and adjacent the upper edge 26 of the right internal sidewall 24. The third inextensible cable 80 is trained over a ninth pulley 86 mounted on the rear face 46 of the movable bulkhead 34 adjacent its lower left corner 40, a tenth pulley 88 that is mounted on the front face 44 of the movable bulkhead 34 in its central vertical transverse plane adjacent its lower edge 50, an eleventh pulley 90 that is mounted on the front face 44 of the movable bulkhead 34 in its central vertical transverse plane adjacent its upper edge 48, and a twelfth pulley 92 that is mounted on the front face 44 of the movable bulkhead 34 adjacent its upper right corner 36.

A fourth inextensible cable 94 has a first end 96 mounted on the body 12 adjacent the rear end 32 of the body 2, on or adjacent the internal floor 16, and adjacent the right internal sidewall 24 and a second end 98 mounted on the body 12 adjacent the front end 30 of the body 12 and adjacent the upper edge 20 of the left internal sidewall 18. The fourth inextensible cable 94 is trained over a thirteenth pulley 100 that is mounted on the rear face 46 of the movable bulkhead 34 adjacent its lower right corner 38, a fourteenth pulley 102 that is mounted on the rear face 46 of the movable bulkhead 34 in its central vertical transverse plane adjacent its lower edge 50, a fifteenth pulley 104 that is mounted on the rear face 46 of the movable bulkhead 34 in its central vertical plane adjacent its upper edge 48, and a sixteenth pulley 106 that is mounted on the front face 44 of the movable bulkhead 34 adjacent its upper left corner 40.

Preferably the second pulley 60 and the tenth pulley 88 are coaxial, the third pulley 62 and the eleventh pulley 90 are coaxial, the sixth pulley 74 and the fourteenth pulley 102 are coaxial, and the seventh pulley 76 and the fifteenth pulley 104 are coaxial.

The First Embodiment of the Bulkhead Moving Means

A first means (such as the fluid cylinder 108 illustrated in FIG. 8, the apparatus disclosed in the previously referenced application by the same inventors, or any other appropriate device) is provided for translating the movable bulkhead 34 along the longitudinal axis of the body 12.

A second means (such as the clamp 110 and fluid cylinder 112 illustrated in FIGS. 8-10) is provided for immobilizing the movable bulkhead 34 relative to the first, second, third, and fourth inextensible cables 52, 66, 80, and 94. Preferably the second means comprises third means for simultaneously gripping and releasing the first, second, third, and fourth inextensible cables 52, 66, 80, and 94.

When the second means 110, 112 is gripping the first, second, third, and fourth inextensible cables 52, 66, 80, and 94 and the first means 108 is moved from its extended to its retracted position, the movable bulkhead 34 is translated incrementally in one direction. Conversely, when the second means 110, 112 is gripping the first, second, third, and fourth inextensible cables 52, 66, 80, and 94 and the first means 108 is moved from its retracted to its extended position, the movable bulkhead 34 is translated incrementally in the other direction.

In addition to moving the movable bulkhead 34, the fluid cylinder 108, the clamp 110, and the fluid cylinder 112 restrain the movable bulkhead 34 against unwanted forward movement due to quick stops and prevent the load from retreating when the movable bulkhead is used in connection with a reciprocating full or partial floor.

The Second Embodiment of the Bulkhead Moving Means

Figure 11:
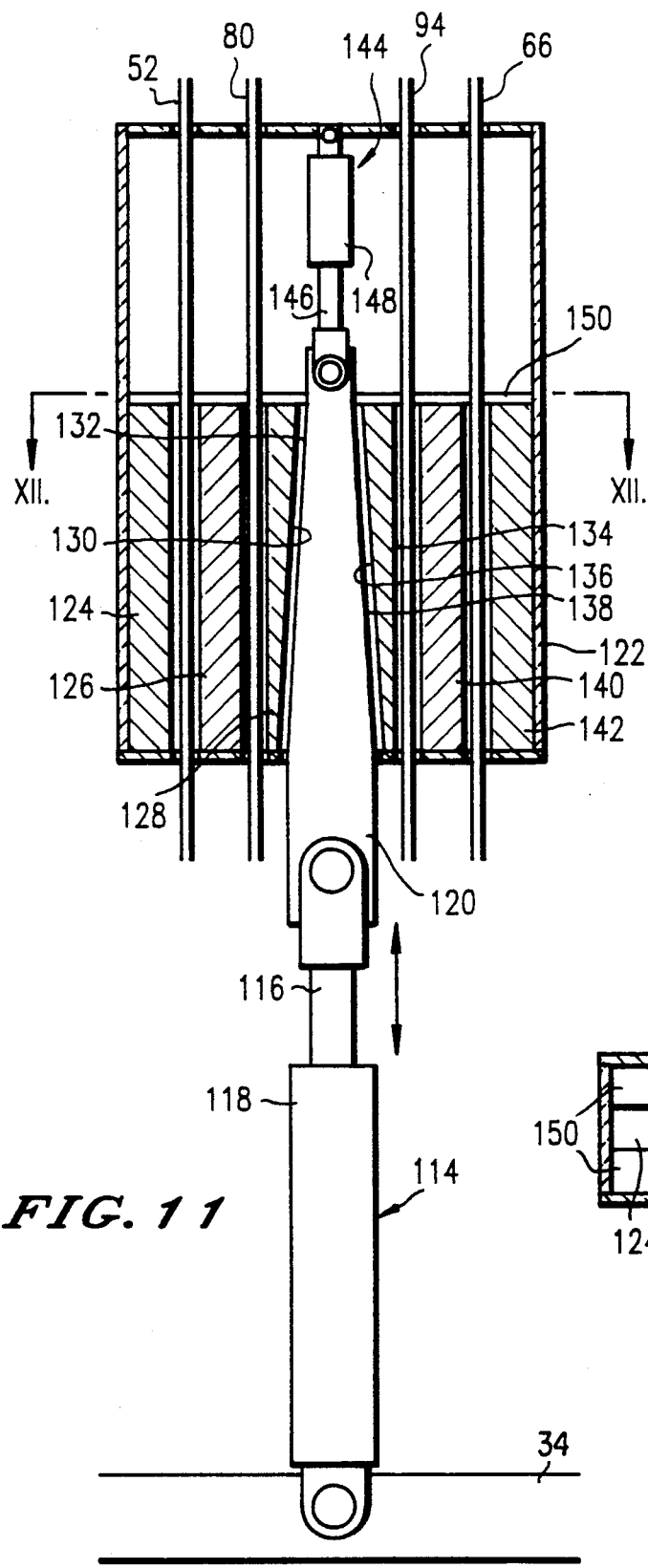
FIG. 11 is a cross-sectional view showing a second embodiment of means for immobilizing the movable bulkhead relative to the inextensible cables in the first embodiment of the invention.
Figure 12:
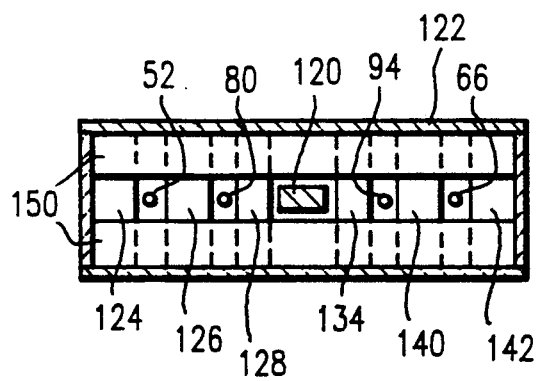
FIG. 12 is a view on the line XII—XII in FIG. 11.

A second embodiment of means for immobilizing the movable bulkhead 34 relative to the first, second, third, and fourth inextensible cables 52, 66, 80, and 94 is shown in FIGS. 11 and 12. In this embodiment a fluid cylinder 114 comprising a piston 116 and a cylinder 118 is mounted on the movable bulkhead 34. A two-sided wedge 120 is mounted on the piston 116 and extends into a brake cage 122 through which the first, second, third, and fourth inextensible cables 52, 66, 80, and 94 pass. The first inextensible cable 52 passes between a fixed brake shoe 124 and a transversely movable brake shoe 126. The third inextensible cable 80 passes between the transversely movable brake shoe 126 and a transversely movable brake shoe 128 that has a wedge-shaped surface 130 sized, shaped, and positioned to cooperate with a wedge-shaped surface 132 on the two-sided wedge 120. The fourth inextensible cable 94 passes between a transversely movable brake shoe 134 that has a wedge-shaped surface 136 sized, shaped, and positioned to cooperate with the wedge-shaped surface 138 on the two-sided wedge 120 and a transversely movable brake shoe 140. The third inextensible cable 66 passes between the transversely movable brake shoe 140 and a fixed brake shoe 142.

Preferably the end of the two-sided wedge 120 remote from the fluid cylinder 114 is connected to a fluid cylinder 144 comprising a piston 146 connected to the two-sided wedge 120 and a cylinder 148 connected to the brake cage 122. The fluid cylinders 114 and 144 are, of course, arranged to work in concert—i.e., one retracts when the other extends, and by the same amount.

Longitudinally extending beams 150 are provided to prevent vertical movement of the brake shoes 126, 128, 134, and 140 without interference with the movement of the two-sided wedge 120 and the first, second, third, and fourth inextensible cables 52, 66, 80, and 94.

As before, in addition to moving the movable bulkhead 34, the bulkhead moving means restrain the movable bulkhead 34 against unwanted forward movement due to quick stops.

The Second Embodiment of the Bulkhead Stabilizing Means

Figure 13:
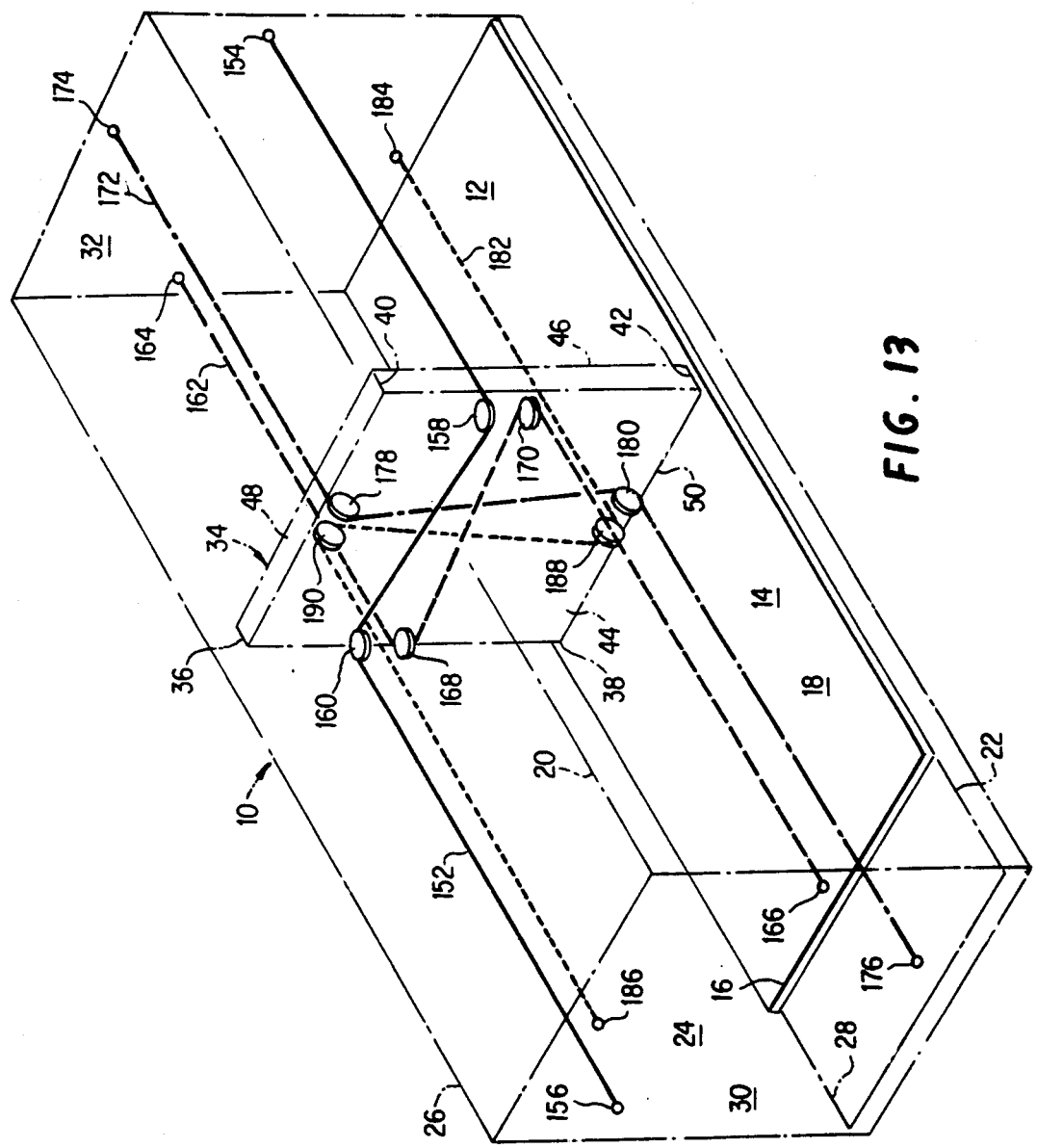
FIG. 13 is a schematic perspective view illustrating a second embodiment of means for stabilizing the moving bulkhead.

A second embodiment of the bulkhead stabilizing means is shown in FIG. 13. Parts that are the same as in the first embodiment are given the same parts numbers.

A first inextensible cable 152 has a first end 154 mounted on the body 12 adjacent the rear end 32 of the body 12 and midway between the upper edge 20 and the lower edge 22 of the left internal sidewall 18 and a second end 156 mounted on the body 12 adjacent the front end 30 of the body 12 and midway between the upper edge 26 and the lower edge 28 of the right internal sidewall 24. The first inextensible cable 152 is trained over a first pulley 158 that is mounted on the movable bulkhead 34 midway between the upper left corner 40 and the lower left corner 42 and over a second pulley 160 that is mounted on the movable bulkhead 34 midway between the upper right corner 36 and the lower right corner 38.

A second inextensible cable 162 has a first end 164 mounted on the body 12 adjacent the rear end 32 of the body 12 and midway between the upper edge 26 and the lower edge 28 of the right internal sidewall 24 and a second end 166 mounted on the body 12 adjacent the front end 30 of the body 12 and midway between the upper edge 20 and the lower edge 22 of the left internal sidewall 18. The second inextensible cable 162 is trained over a third pulley 168 that is mounted on the movable bulkhead 34 midway between the upper right corner 36 and the lower right corner 38 and over a fourth pulley 170 that is mounted on movable bulkhead 34 midway between the upper left corner 40 and the lower left corner 42.

A third inextensible cable 172 has a first end 174 mounted on or adjacent the rear end 32 of the body 12 and midway between the upper edge 26 of the right internal sidewall 24 and the upper edge 20 of the left internal sidewall 18 and a second end 176 mounted on or adjacent the front end 30 of the body 12 and midway between the lower edge 28 of the right internal sidewall 24 and the lower edge 22 of the left internal sidewall 18. The third inextensible cable 172 is trained over a fifth pulley 178 that is mounted on the movable bulkhead 34 midway between the upper right corner 36 and the upper left corner 40 and over a sixth pulley 180 that is mounted on the movable bulkhead 34 midway between the lower right corner 38 and the lower left corner 42.

A fourth inextensible cable 182 has a first end 184 mounted on or adjacent the rear end 32 of the body 12 and midway between the lower edge 28 of the right internal sidewall 24 and the lower edge 22 of the left internal sidewall 18 and a second end 186 mounted on or adjacent the front end 30 of the body 12 and midway between the upper edge 26 of the right internal sidewall 24 and the upper edge 20 of the left internal sidewall 18. The fourth inextensible cable 182 is trained over a seventh pulley 188 that is mounted on the movable bulkhead 34 and midway between the lower right corner 38 and the lower left corner 42 and over an eighth pulley 190 that is mounted on the movable bulkhead 34 midway between the upper right corner 32 and the upper left corner 40.

Preferably the first pulley 158 and the fourth pulley 170 are coaxial, the second pulley 160 and the third pulley 168 are coaxial, the fifth pulley 178 and the eighth pulley 190 are coaxial, and the sixth pulley 180 and the seventh pulley 188 are coaxial.

While no means for moving the movable bulkhead 34 are shown in FIG. 13, it is contemplated that it will be moved by means such as those disclosed above, those disclosed below, those disclosed in the previously referenced application by the same inventors, or any other appropriate device.

The Third Embodiment of the Bulkhead Stabilizing Means

Figure 14:
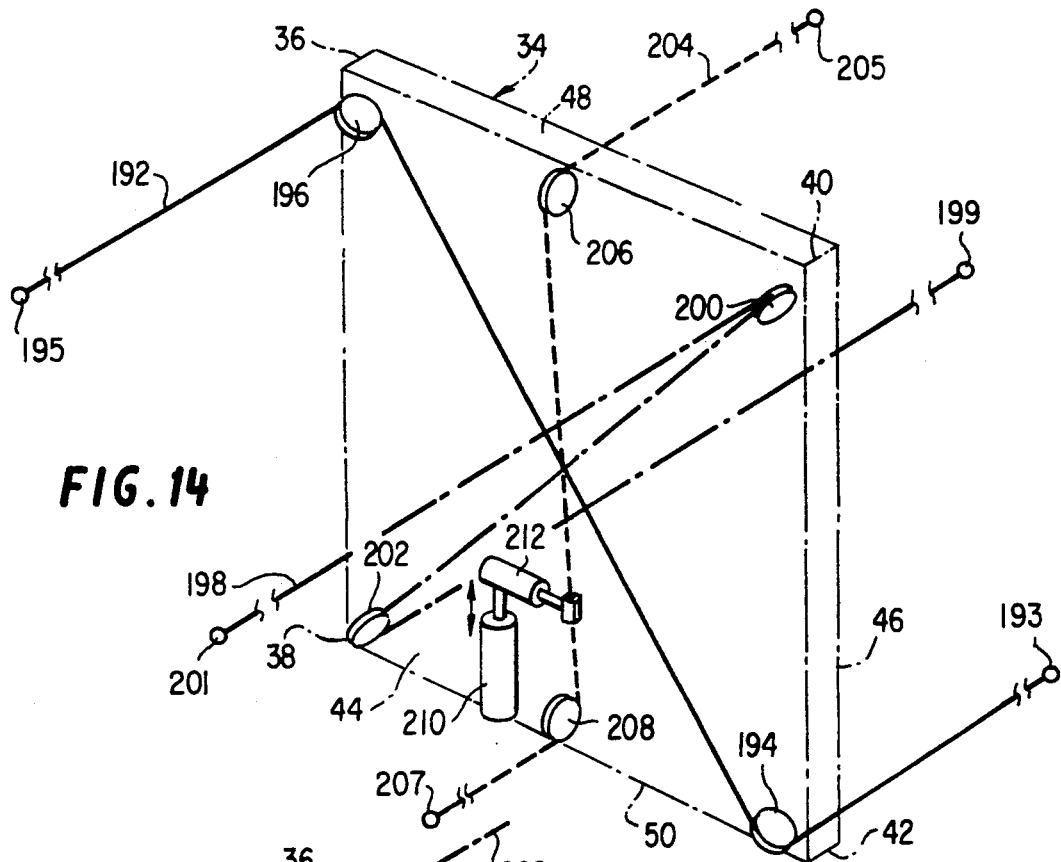
FIG. 14 is a schematic perspective view illustrating a third embodiment of means for stabilizing the moving bulkhead and a third embodiment of means for moving the moving bulkhead.

A third embodiment of the bulkhead stabilizing means is shown in FIG. 14. Parts that are the same as in the first embodiment are given the same parts numbers.

A first inextensible cable 192 has a first end 193 mounted on the body 12 adjacent the rear end 32 of the body 12 and adjacent the lower edge 2 of the left internal sidewall 18 and a second end 195 mounted on the body 12 adjacent the front end 30 of the body 12 and adjacent the upper edge 26 of the right internal sidewall 24. The first inextensible cable 192 is trained over a first pulley 194 that is mounted on the movable bulkhead 34 adjacent the lower left corner 42 and over a second pulley 196 that is mounted on the movable bulkhead 34 adjacent the upper right corner 36.

A second inextensible cable 198 has a first end 199 mounted on the body 12 adjacent the rear end 32 of the body 12 and adjacent the lower edge 22 of the left internal sidewall 18 and a second end 201 mounted on the body 12 adjacent the front end 30 of the body 12 and adjacent the upper edge 26 of the right internal sidewall 24. The second inextensible cable 198 is trained over a third pulley 200 that is mounted on the movable bulkhead 34 adjacent the upper left corner 40 and over a fourth pulley 202 that is mounted on the movable bulkhead 34 adjacent the lower right corner 38.

A third inextensible cable 204 has a first end 205 mounted on or adjacent the rear end 32 of the body 12 and midway between the upper edge 26 of the right internal sidewall 24 and the upper edge 20 of the left internal sidewall 18 and a second end 207 mounted on or adjacent the front end 30 of the body 12 and midway between the lower edge 28 of the right internal sidewall 24 and the lower edge 22 of the left internal sidewall 18. The third inextensible cable 204 is trained over a fifth pulley 206 that is mounted on the movable bulkhead 34 midway between the upper right corner 36 and the upper left corner 40 and over a sixth pulley 208 that is mounted on the movable bulkhead 34 midway between the lower right corner 38 and the lower left corner 42.

Although not illustrated, it is contemplated that the third inextensible cable 204 could be rotated by 90° in either direction from the position shown in FIG. 14. That is, the fifth and sixth pulleys 206 and 208 could be located midway between the upper right corner 36 and the lower right corner 38 and midway between the upper left corner 40 and the lower left corner 42, respectively, or vice versa.

The Third Embodiment of the Bulkhead Moving Means

A third means for moving the movable bulkhead 34 is illustrated in FIG. 14. It comprises a pneumatic cylinder 210 one end of which is mounted on the movable bulkhead 34 and that is operable in the direction parallel to the adjacent run of the third inextensible cable 204 and a clamp 212 that is mounted on the other end of the pneumatic cylinder 210 and that grips and releases the third inextensible cable 204. As before, movement of the pneumatic cylinder 210 in either direction while the clamp 212 is closed on the third inextensible cable 204 causes corresponding incremental movement of the movable bulkhead 34.

Although not illustrated, it is contemplated that the pneumatic cylinder 210 and the clamp 212 could be positioned along the run of any one of the inextensible cables.

As before, in addition to moving the movable bulkhead 34, the bulkhead moving means restrain the movable bulkhead 34 against unwanted forward movement due to quick stops.

The Fourth Embodiment of the Bulkhead Stabilizing Means

Figure 15:
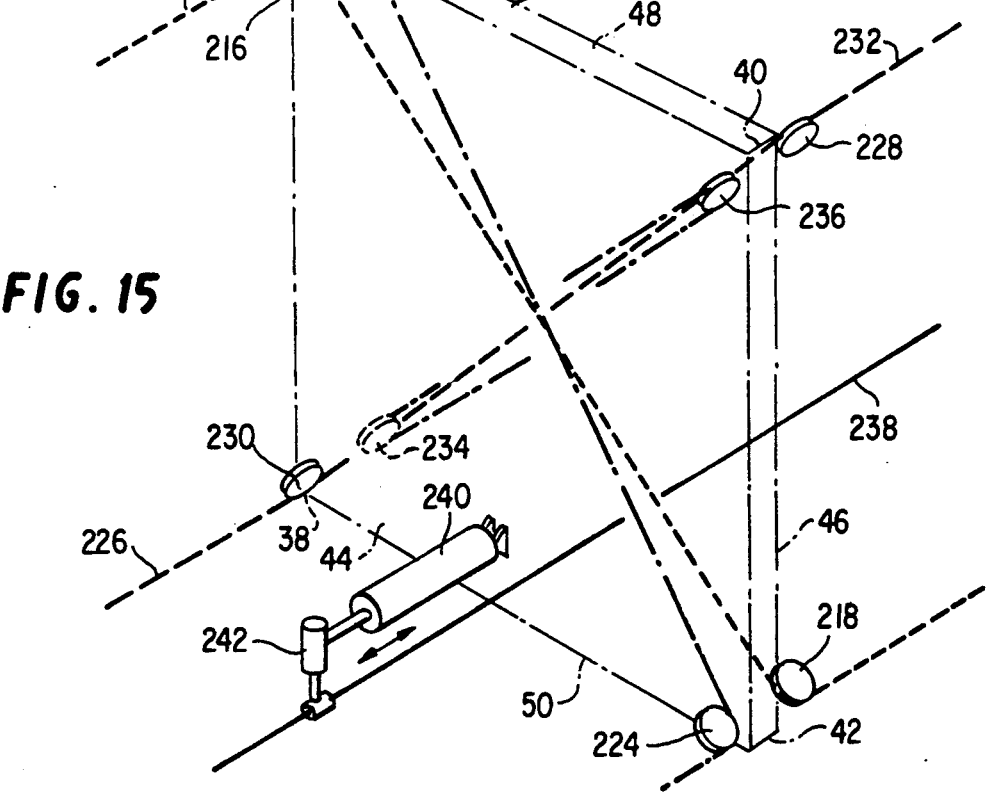
FIG. 15 is a schematic perspective view illustrating a fourth embodiment of means for stabilizing the moving bulkhead and a fourth embodiment of means for moving the moving bulkhead.

A fourth embodiment of the bulkhead stabilizing means is shown in FIG. 15. Parts that are the same as in the first embodiment are given the same parts numbers.

A first inextensible cable 214 has a first end (not shown) mounted on the body 12 adjacent the rear end 32 of the body 12 and adjacent the lower edge 22 of the left internal sidewall 18 and a second end (not shown) mounted on the body 12 adjacent the front end 30 of the body 12 and adjacent the upper edge 26 of the right internal sidewall 24. The first inextensible cable 214 is trained over a first pulley 216 that is mounted on the movable bulkhead 34 adjacent the upper right corner 36 and over a second pulley 218 that is mounted on the movable bulkhead 34 adjacent the lower left corner 42.

A second inextensible cable 220 has a first end (not shown) mounted on the body 12 adjacent the front end 30 of the body 12 and adjacent the lower edge 22 of the left internal sidewall 18 and a second end (not shown) mounted on the body 12 adjacent the rear end 32 of the body 12 and adjacent the upper edge 26 of the right internal sidewall 24. The second inextensible cable 220 is trained over a third pulley 222 that is mounted on the movable bulkhead 34 adjacent the upper right corner 36 and over a fourth pulley 224 that is mounted on the movable bulkhead 34 adjacent the lower left corner 42.

A third inextensible cable 226 has a first end (not shown) mounted on the body 12 adjacent the rear end 32 of the body 12 and adjacent the upper edge 20 of the left internal sidewall 18 and a second end (not shown) mounted on the body 12 adjacent the front end 30 of the body 12 and adjacent the lower edge 22 of the right internal sidewall 24. The third inextensible cable 226 is trained over a fifth pulley 228 that is mounted on the movable bulkhead 34 adjacent the upper left corner 40 and over a sixth pulley 230 that is mounted on the movable bulkhead 34 adjacent the lower right corner 38.

A fourth inextensible cable 232 has a first end (not shown) mounted on the body 12 adjacent the front end 30 of the body 12 and adjacent the upper edge 20 of the left internal sidewall 28 and a second end (not shown) mounted on the body 12 adjacent the rear end 32 of the body 12 and adjacent the lower edge 28 of the right internal sidewall 24. The fourth inextensible cable 232 is trained over a seventh pulley 234 that is mounted on the movable bulkhead 34 adjacent the lower right corner 38 and over an eighth pulley 236 that is mounted on the movable bulkhead 34 adjacent the upper left corner 40.

The Fourth Embodiment of the Bulkhead Moving Means

A fourth embodiment of means for moving the movable bulkhead 34 is shown in FIG. 15. It comprises a fifth inextensible cable 238 that has a first end (not shown) mounted on the body 12 adjacent the rear end 32 of the body 12 and a second end (not shown) mounted on the body 12 adjacent the front end 30 of the body 12, a pneumatic cylinder 240 one end of which is mounted on the movable bulkhead 34 and that is operable in the direction parallel to the adjacent run of the fifth inextensible cable 238, and a clamp 242 that is mounted on the other end of the pneumatic cylinder 240 and that grips and releases the fifth inextensible cable 238. As before, movement of the pneumatic cylinder 248 in either direction while the clamp 242 is closed on the fifth inextensible cable 238 causes corresponding incremental movement of the movable bulkhead 34.

Although the fifth inextensible cable 238 is illustrated as lying close to (perhaps in a groove in) the internal floor 16 and in the central longitudinal plane of the body 12, it is contemplated that it could be located anywhere in the internal volume of the body 12.

As before, in addition to moving the movable bulkhead 34, the bulkhead moving means restrain the movable bulkhead 34 against unwanted forward movement due to quick stops.

The Fifth Embodiment of the Bulkhead Moving Means

Figure 16:
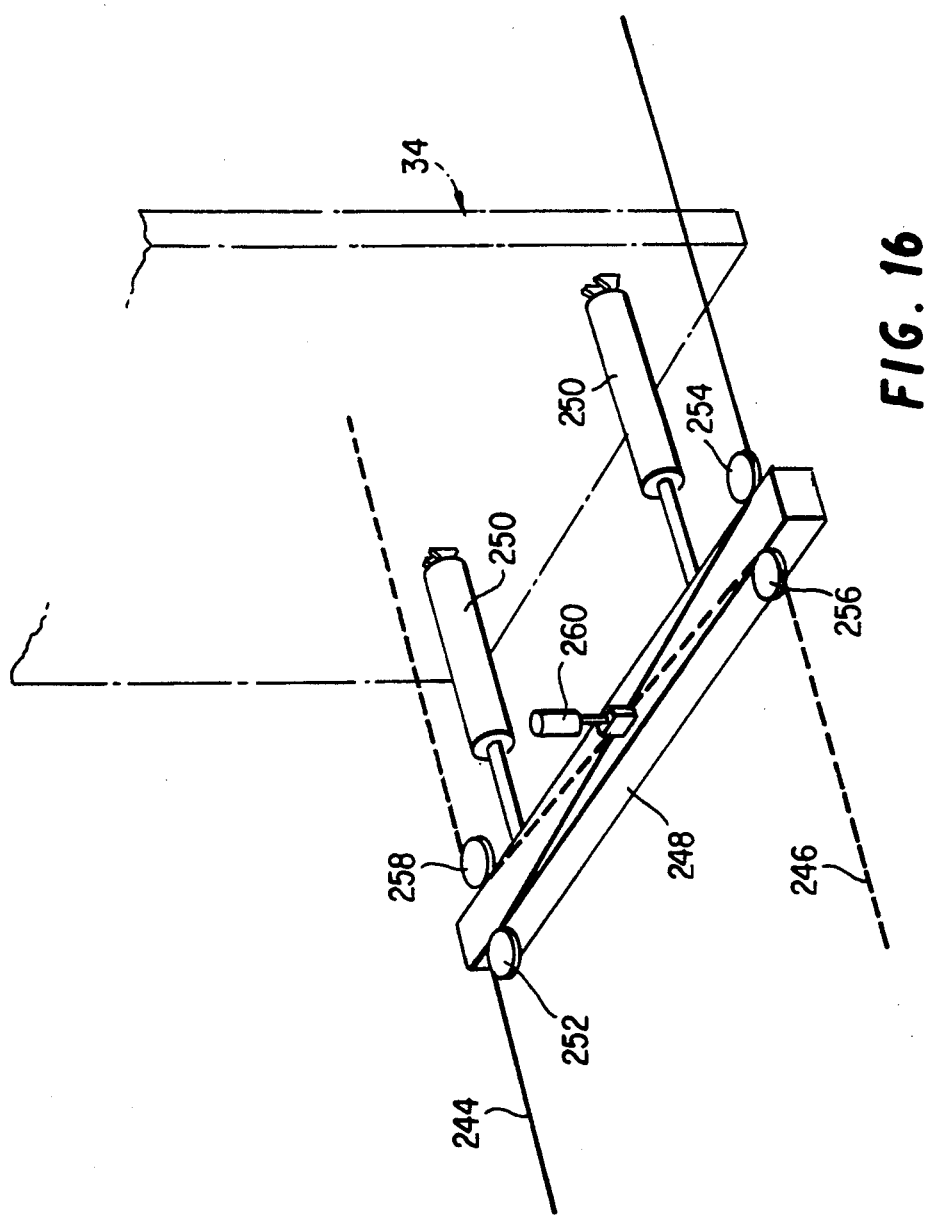
FIG. 16 is a schematic perspective view illustrating a fifth embodiment of means for moving the moving bulkhead.

FIG. 16 illustrates still another embodiment of means for moving the movable bulkhead 34. This embodiment is similar in concept to the fourth embodiment (illustrated in FIG. 15) in that the bulkhead moving means are separated from the bulkhead stabilizing means (which are not illustrated in FIG. 16). It differs, however, in that the movable bulkhead 34 is drawn along two inextensible cables (rather than one). In addition, it is not a simple duplication of the embodiment shown in FIG. 15, for the two inextensible cables are gripped simultaneously by a single clamping means.

A first inextensible cable 244 has a first end (not shown) mounted on the body 12 adjacent the rear end 32 of the body 12 and on or adjacent to the left internal sidewall 18 and a second end (not shown) mounted on the body 12 adjacent the front end 30 of the body 12 and on or adjacent the right internal sidewall 24. A second inextensible cable 246 has a first end (not shown) mounted on the body 12 adjacent the rear end 32 of the body 12 and on or adjacent the right internal sidewall 24 and a second end (not shown) mounted on the body 12 adjacent the front end 30 of the body 12 and on or adjacent the left internal sidewall 18. A transverse beam 248 is mounted on the movable bulkhead 34 by means of two pneumatic cylinders 250 that extend in the longitudinal direction of the body 12. The first inextensible cable 244 is trained over a first pulley 252 that is mounted on the transverse beam 248 adjacent the right internal sidewall 24 and over a second pulley 254 that is mounted on the transverse beam 248 adjacent the left internal sidewall 18. The second inextensible cable 246 is trained over a third pulley 256 that is mounted on the transverse beam 248 adjacent the left internal sidewall 18 and over a fourth pulley 258 that is mounted on the transverse beam 248 adjacent the right internal sidewall 24. A clamp 260 is operable to simultaneously grip and release the first inextensible cable 244 and the second inextensible cable 246. As before, movement of the pneumatic cylinders 250 in either direction while the clamp 260 is closed on the first and second inextensible cables 244 and 246 causes corresponding incremental movement of the movable bulkhead 34.

Although the transverse beam 248 and the first and second inextensible cables 244 and 246 are illustrated as lying close to the internal floor 16, it is contemplated that they could be located anywhere in the internal volume of the body 12.

As before, in addition to moving the movable bulkhead 34, the bulkhead moving means restrain the movable bulkhead 34 against unwanted forward movement due to quick stops.

The Fifth Embodiment of the Bulkhead Stabilizing Means

Figure 17:
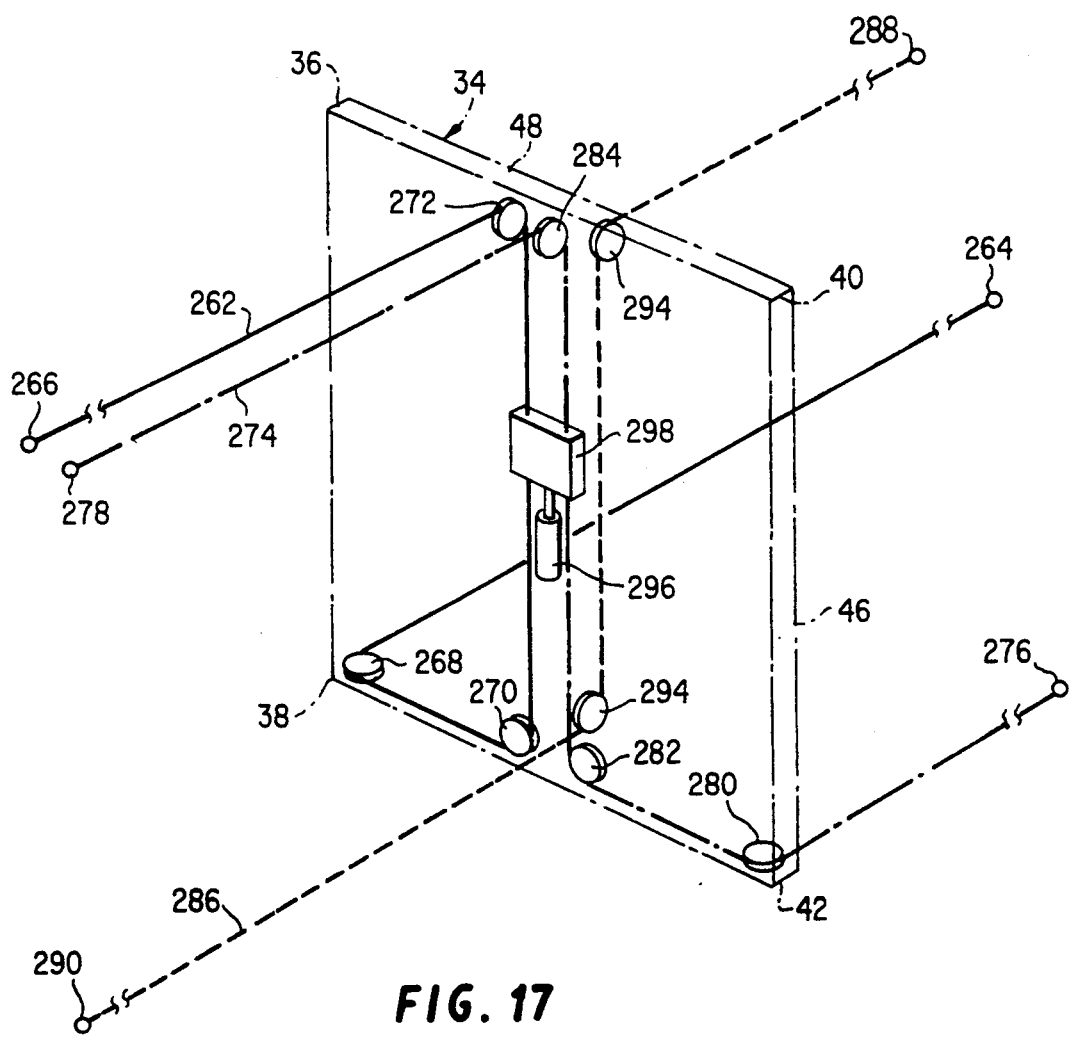
FIG. 17 is a schematic perspective view illustrating a fifth embodiment of means for stabilizing the moving bulkhead and a sixth embodiment of means for moving the moving bulkhead.

A fifth embodiment of the bulkhead stabilizing means is shown in FIG. 17. Parts that are the same as in the first embodiment are given the same parts numbers.

A first inextensible 262 has a first end 264 mounted on the body 12 adjacent the rear end 32 of the body 12 and adjacent the lower edge 20 of the right internal sidewall 24 and a second end 266 mounted on the body 12 adjacent the front end 30 of the body 12 and midway between the upper edge 26 of the right internal sidewall 24 and the upper edge 20 of the left internal sidewall 18. The first inextensible cable 262 is trained over a first pulley 268 that is mounted on the movable bulkhead 34 adjacent the lower right corner 38, over a second pulley 270 that is mounted on the movable bulkhead 34 midway between the lower right corner 38 and the lower left corner 42, and over a third pulley 272 that is mounted on the movable bulkhead 34 midway between the upper right corner 36 and the lower left corner 40.

A second inextensible cable 274 has a first end 276 mounted on the body 12 adjacent the rear end 32 of the body 12 and adjacent the lower edge 22 of the left internal sidewall and a second end 278 mounted on the body 12 adjacent the front end 30 of the body 12 and midway between upper edge 26 of the right internal sidewall 24 and the upper edge 20 of the left internal sidewall 18. The second inextensible cable 274 is trained over a fourth pulley 280 that is mounted on the movable bulkhead 34 adjacent the lower left corner 42, over a fifth pulley 282 that is mounted on the movable bulkhead 34 midway between the lower right corner 38 and the lower left corner 42, and over a sixth pulley 284 that is mounted on the movable bulkhead 34 midway between the upper right corner 36 and the upper left corner 40.

A third inextensible cable 286 has a first end 288 mounted on the body 12 adjacent the rear end 32 of the body 12 and midway between the upper edge 26 of the right internal sidewall 24 and the upper edge 20 of the left internal side-wall 18 and a second end 290 that is mounted on the body 12 adjacent the first end 30 of the body 12 and midway between the lower edge 28 of the right internal sidewall 24 and the lower edge 22 of the left internal sidewall 18. The third inextensible cable is trained over a seventh pulley 292 that is mounted on the movable bulkhead 34 midway between the upper right corner 36 and the upper left corner 40 and over an eighth pulley 294 that is mounted on the movable bulkhead 34 midway between the lower right corner 38 and the lower left corner 42.

Although not illustrated, it is contemplated that the first inextensible cable 262, the second inextensible cable 274, and the third inextensible cable 286 could all be rotated by 90° in either direction from the position shown in FIG. 17.

The Sixth Embodiment of the Bulkhead Moving Means

A sixth means for moving the movable bulkhead 34 is illustrated in FIG 17. It comprises a pneumatic cylinder 296 one end of which is mounted on the movable bulkhead 34 and that is operable in the direction parallel to the adjacent runs of the first inextensible cable 262 and the second inextensible cable 274 and a clamp 298 that is mounted on the other end of the pneumatic cylinder 296 and that grips and releases the first and second inextensible cables 262 and 274. As before, movement of the pneumatic cylinder 296 in either direction while the clamp 298 is closed on the first and second inextensible cables 262 and 274 cause corresponding incremental movement of the movable bulkhead 34.

Although not illustrated, it is contemplated that the pneumatic cylinder 296 and the clamp 298 could be positioned along the run of the third inextensible cable 286.

As before, in addition to moving the movable bulkhead 34, the bulkhead moving means restrains the movable bulkhead 34 against unwanted forward movement due to quick stops.

Illustration of a Segmented Floor

FIG. 18 illustrates an internal floor 16 composed of three transfer segments 300. Each transfer segment 300 is independently movable to and from in the longitudinal direction by its own pneumatic cylinder 302 one end of which is mounted on the front end 30 of the body 12 and the other end of which is mounted on the corresponding transfer segment 300. Of course, it is contemplated that the pneumatic cylinder 302 could be mounted at the rear end 32 of the body 12, could be mounted beneath the corresponding transfer segment 300, or could be replaced by other drive means entirely.

CAVEAT

Obviously, numerous modifications and variations of the present invention are possible in light of the above teachings. It is therefore to be understood that, within the scope of the appended Claims, the invention may be practiced otherwise than as specifically described herein.

WHAT IS CLAIMED AS NEW AND DESIRED TO BE SECURED BY LETTERS PATENT OF THE UNITED STATES IS:

1. A cargo carrying vehicle comprising:
   (a) a body having an interior, an internal floor, a left internal sidewall having an upper edge and a lower edge, a right internal sidewall having an upper edge and a lower edge, a longitudinal axis, a front end, and a rear end;
   (b) a movable bulkhead mounted in said interior above said internal floor for movement relative to said body, said movable bulkhead having an upper right corner, a lower right corner, an upper left corner, a lower left corner, a central vertical transverse plane, a central vertical longitudinal plane, a front face, a rear face, an upper edge, and a lower edge;
   (c) a first inextensible cable that:
      (i) has a first end mounted on said body adjacent said rear end of said body and adjacent said upper edge of said left internal sidewall;
      (ii) has a second end mounted on said body adjacent said front end of said body, on or adjacent said internal floor, and adjacent said right internal sidewall; and
      (iii) is trained over a first pulley that is mounted on the rear face of said movable bulkhead adjacent its upper left corner, a second pulley that is mounted on the front face of said movable bulkhead in said central vertical transverse plane adjacent said lower edge, a third pulley that is mounted on the front face of said movable bulkhead in said central vertical transverse plane adjacent said upper edge, and a fourth pulley that is mounted on the front face of said movable bulkhead adjacent its lower right corner;
   (d) a second inextensible cable that:
      (i) has a first end mounted on said body adjacent said rear end of said body and adjacent said upper edge of said right internal sidewall;
      (ii) has a second end mounted on said body adjacent said first end of said body, on or adjacent said internal floor, and adjacent said left internal sidewall; and
      (iii) is trained over a fifth pulley that is mounted on the rear face of said movable bulkhead adjacent its upper right corner, a sixth pulley that is mounted on the rear face of said movable bulkhead in said central vertical transverse plane adjacent said lower edge, a seventh pulley that is mounted on the rear face of said movable bulkhead in said central transverse plane adjacent said upper edge, and an eighth pulley that is mounted on the front face of said movable bulkhead adjacent its lower left corner;
   (e) a third inextensible cable that:
      (i) has a first end mounted on said body adjacent said rear end of said body, on or adjacent said internal floor, and adjacent said left internal sidewall;
      (ii) has a second end mounted on said body adjacent said front end of said body and adjacent said upper edge of said right internal sidewall; and
      (iii) is trained over a ninth pulley that is mounted on the rear face of said movable bulkhead adjacent its lower left corner, a tenth pulley that is mounted on the front face of said movable bulkhead in said central vertical transverse plane adjacent said lower edge, an eleventh pulley that is mounted on the front face of said movable bulkhead in said central vertical transverse plane adjacent said upper edge, and a twelfth pulley that is mounted on the front face of said movable bulkhead adjacent its upper right corner; and
   (f) a fourth inextensible cable that:
      (i) has a first end mounted on said body adjacent said rear end of said body, on or adjacent said internal floor, and adjacent said right internal side wall;
      (ii) has a second end mounted on said body adjacent said front end of said body and adjacent said upper edge of said left internal sidewall; and
      (iii) is trained over a thirteenth pulley that is mounted on the rear face of said movable bulkhead adjacent its lower right corner, a fourteenth pulley that is mounted on the rear face of said movable bulkhead in said central vertical transverse plane adjacent said lower edge, a fifteenth pulley that is mounted on the rear face of said movable bulkhead in said central vertical plane adjacent said upper edge, and a sixteenth pulley that is mounted on the front face of said movable bulkhead adjacent its upper left corner.

2. A cargo carrying vehicle as recited in claim 1 and further comprising first means for translating said movable bulkhead along said longitudinal axis of said body.

3. A cargo carrying vehicle as recited in claim 2 and further comprising second means for immobilizing said movable bulkhead relative to said first, second, third, and fourth inextensible cables.

4. A cargo carrying vehicle as recited in claim 3 wherein said first means comprise a fluid cylinder one end of which is connected to said movable bulkhead and one end of which is connected to said second means.

5. A cargo carrying vehicle as recited in claim 1 and further comprising second means for immobilizing said movable bulkhead relative to said first, second, third, and fourth inextensible cables.

6. A cargo carrying vehicle as recited in claim 5 wherein said second means comprises a plurality of brake shoes translatable into engagement with said first, second, third, and fourth inextensible cables.

7. A cargo carrying vehicle as recited in claim 1 and further comprising third means mounted on said movable bulkhead for gripping and releasing said first, second, third, and fourth inextensible cables.

8. A cargo carrying vehicle as recited in claim 1 wherein said third and eleventh pulleys are coaxial.

9. A cargo carrying vehicle as recited in claim 1 wherein said seventh and fifteenth pulleys are coaxial.

10. A cargo carrying vehicle as recited in claim 1 wherein said second and tenth pulleys are coaxial.

11. A cargo carrying vehicle as recited in claim 1 wherein said sixth and fourteenth pulleys are coaxial.

12. A cargo carrying vehicle as recited in claim 1 wherein:
    (a) said third and eleventh pulleys are coaxial;

(b) said seventh and fifteenth pulleys are coaxial;
(c) said second and tenth pulleys are coaxial; and
(d) said sixth and fourteenth pulleys are coaxial.

13. A cargo carry vehicle as recited in claim 1 wherein said internal floor is fixed.

14. A cargo carry vehicle as recited in claim 1 wherein said internal floor is reciprocating.

15. A cargo carry vehicle as recited in claim 14 wherein said internal floor is segmented.

16. A cargo carry vehicle as recited in claim 15 wherein the segments of said internal floor are immediately adjacent to each other.

17. A cargo carrying vehicle comprising:
(a) a body having an interior, an internal floor, a left internal sidewall having an upper edge and a lower edge, a right internal sidewall having an upper edge and a lower edge, a longitudinal axis, a front end, and a rear end;
(b) a movable bulkhead mounted in said interior above said internal floor for movement relative to said body, said movable bulkhead having an upper right corner, a lower right corner, an upper left corner, a lower left corner, a central vertical transverse plane, a central vertical longitudinal plane, a front face, a rear face, an upper edge, and a lower edge;
(c) a plurality of inextensible cables:
 (i) that are mounted on said body;
 (ii) that are operatively connected to said movable bulkhead; and
 (iii) relative to which said movable bulkhead is movable;
(d) first means for gripping and releasing at least one of said plurality of inextensible cable; and
(e) second means for moving said first means relative to said movable bulkhead.

18. A cargo carrying vehicle as recited in claim 17 wherein said plurality of inextensible cables comprise:
(a) a first inextensible cable that:
 (i) has a first end mounted on said body adjacent said rear end of said body and adjacent said upper edge of said left internal sidewall;
 (ii) has a second end mounted on said body adjacent said front end of said body, on or adjacent said internal floor, and adjacent said right internal sidewall; and
 (iii) is trained over a first pulley that is mounted on the rear face of said movable bulkhead adjacent its upper left corner, a second pulley that is mounted on the front face of said movable bulkhead in said central vertical transverse plane adjacent said lower edge, a third pulley that is mounted on the front face of said movable bulkhead in said central vertical transverse plane adjacent said upper edge, and a fourth pulley that is mounted on the front face of said movable bulkhead adjacent its lower right corner;
(b) a second inextensible cable that:
 (i) has a first end mounted on said body adjacent said rear end of said body and adjacent said upper edge of said right internal sidewall;
 (ii) has a second end mounted on said body adjacent said first end of said body, on or adjacent said internal floor, and adjacent said left internal sidewall; and
 (iii) is trained over a fifth pulley that is mounted on the rear face of said movable bulkhead adjacent its upper right corner, a sixth pulley that is mounted on the rear face of said movable bulkhead in said central vertical transverse plane adjacent said lower edge, a seventh pulley that is mounted on the rear face of said movable bulkhead in said central transverse plane adjacent said upper edge, and an eighth pulley that is mounted on the front face of said movable bulkhead adjacent its lower left corner;
(c) a third inextensible cable that:
 (i) has a first end mounted on said body adjacent said rear end of said body, on or adjacent said internal floor, and adjacent said left internal sidewall;
 (ii) has a second end mounted on said body adjacent said front end of said body and adjacent said upper edge of said right internal sidewall; and
 (ii) is trained over a ninth pulley that is mounted on the rear face of said movable bulkhead adjacent its lower left corner, a tenth pulley that is mounted on the front face of said movable bulkhead in said central vertical transverse plane adjacent said lower edge, an eleventh pulley that is mounted on the front face of said movable bulkhead in said central vertical transverse plane adjacent said upper edge, and a twelfth pulley that is mounted on the front face of said movable bulkhead adjacent its upper right corner; and
(d) a fourth inextensible that:
 (i) has a first end mounted on said body adjacent said rear end of said body, on or adjacent said internal floor, and adjacent said right internal sidewall;
 (ii) has a second end mounted on said body adjacent said front end of said body and adjacent said upper edge of said left internal sidewall; and
 (iii) is trained over a thirteenth pulley that is mounted on the rear face of said movable bulkhead adjacent its lower right corner, a fourteenth pulley that is mounted on the rear face of said movable bulkhead in said central vertical transverse plane adjacent said lower edge, a fifteenth pulley that is mounted on the rear face of said movable bulkhead in said central vertical plane adjacent said upper edge, and a sixteenth pulley that is mounted on the front face of said movable bulkhead adjacent its upper left corner.

19. A cargo carrying vehicle as recited in claim 18 wherein said first means grip and release said first, second, third, and fourth inextensible cables.

20. A cargo carrying vehicle as recited in claim 19 wherein said first means comprises a fluid cylinder one end of which is connected to said movable bulkhead.

21. A cargo carrying vehicle as recited in claim 18 wherein said first means comprises a plurality of brake shoes translatable into engagement with said first, second, third, and fourth inextensible cables.

22. A cargo carrying vehicle as recited in claim 18 wherein said third and eleventh pulleys are coaxial.

23. A cargo carrying vehicle as recited in claim 18 wherein said seventh and fifteenth pulleys are coaxial.

24. A cargo carrying vehicle as recited in claim 18 wherein said second and tenth pulleys are coaxial.

25. A cargo carrying vehicle as recited in claim 18 wherein said sixth and fourteenth pulleys are coaxial.

26. A cargo carrying vehicle as recited in claim 18 wherein:
(a) said third and eleventh pulleys are coaxial;
(b) said seventh and fifteenth pulleys are coaxial;

(c) said second and tenth pulleys are coaxial; and
(d) said sixth and fourteenth pulleys are coaxial.

27. A cargo carrying vehicle as recited in claim 19 wherein said first means comprises a fluid cylinder one end of which is connected to said movable bulkhead.

28. A cargo carrying vehicle as recited in claim 17 wherein said first means comprises a plurality of brake shoes translatable into engagement with said plurality of inextensible cables.

29. A cargo carry vehicle as recited in claim 17 wherein said internal floor is fixed.

30. A cargo carry vehicle as recited in claim 17 wherein said internal floor is reciprocating.

31. A cargo carry vehicle as recited in claim 30 wherein said internal floor is segmented.

32. A cargo carry vehicle as recited in claim 31 wherein the segments of said internal floor are immediately adjacent to each other.

33. A cargo carrying vehicle comprising:
(a) a body having an interior, an internal floor, a left internal sidewall having an upper edge and a lower edge, a right internal sidewall having an upper edge and a lower edge, a longitudinal axis, a front end, and a rear end;
(b) a movable bulkhead mounted in said interior above said internal floor for movement relative to said body, said movable bulkhead having an upper right corner, a lower right corner, an upper left corner, a lower left corner, a central vertical transverse plane, a central vertical longitudinal plane, a front face, a rear face, an upper edge, and a lower edge;
(c) an inextensible cable that has a first end mounted on said body adjacent said rear end of said body and a second end mounted on said body adjacent said front end of said body;
(d) a pneumatic cylinder one end of which is mounted on said movable bulkhead and that is operable in the direction parallel to the adjacent run of said inextensible cable; and
(e) a clamp that is mounted on the other end of said pneumatic cylinder and that grips and releases said inextensible cable.

34. A cargo carrying vehicle as recited in claim 33 wherein said inextensible cable lies close to said internal floor.

35. A cargo carry vehicle as recited in claim 33 wherein said internal floor is fixed.

36. A cargo carry vehicle as recited in claim 33 wherein said internal floor is reciprocating.

37. A cargo carry vehicle as recited in claim 36 wherein said internal floor is segmented.

38. A cargo carry vehicle as recited in claim 37 wherein the segment of said internal floor are immediately adjacent to each other.

* * * * *